Figure 5:
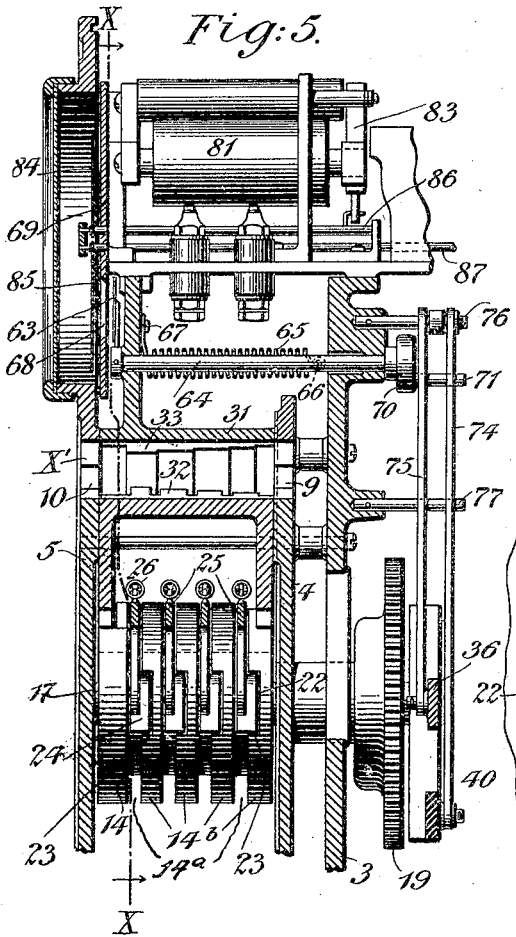

No. 794,423. PATENTED JULY 11, 1905.
T. H. PATENALL.
APPARATUS FOR CONTROLLING TRAFFIC ON RAILWAYS.
APPLICATION FILED OCT. 18, 1904.
6 SHEETS—SHEET 1.
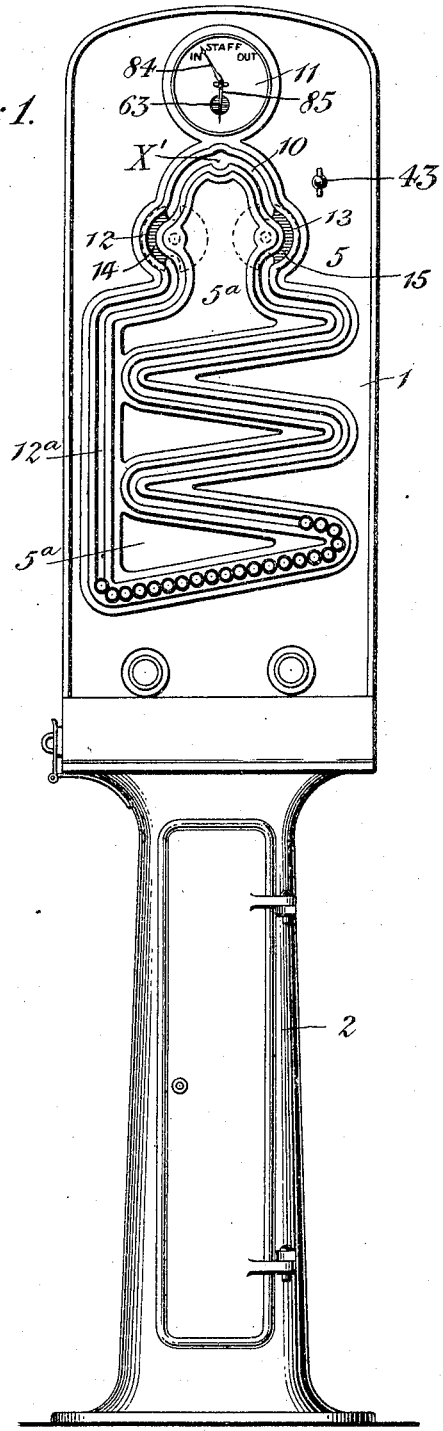
Fig: 1.
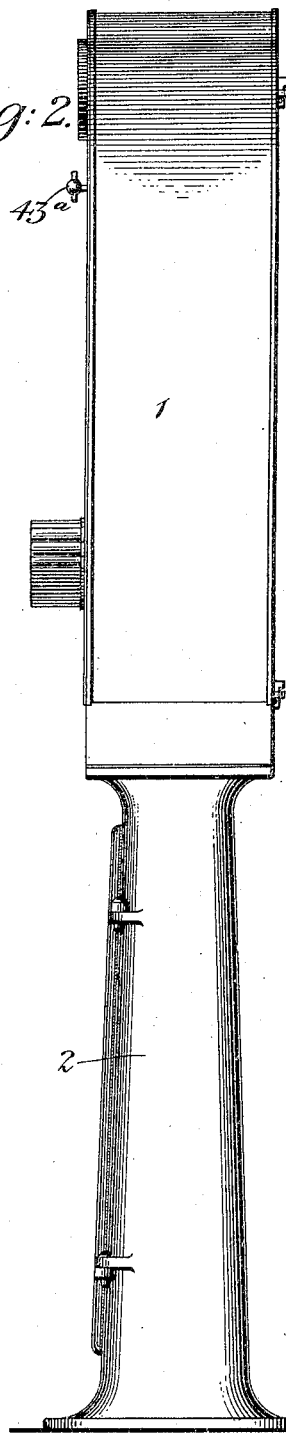
Fig: 2.
Witnesses:
John A. Rennie.
G. Herman Wegner.
Inventor:
Thomas H. Patenall
By ........
his Attorney.

No. 794,423. PATENTED JULY 11, 1905.
T. H. PATENALL.
APPARATUS FOR CONTROLLING TRAFFIC ON RAILWAYS.
APPLICATION FILED OCT. 18, 1904.
6 SHEETS—SHEET 2.
Fig: 3.
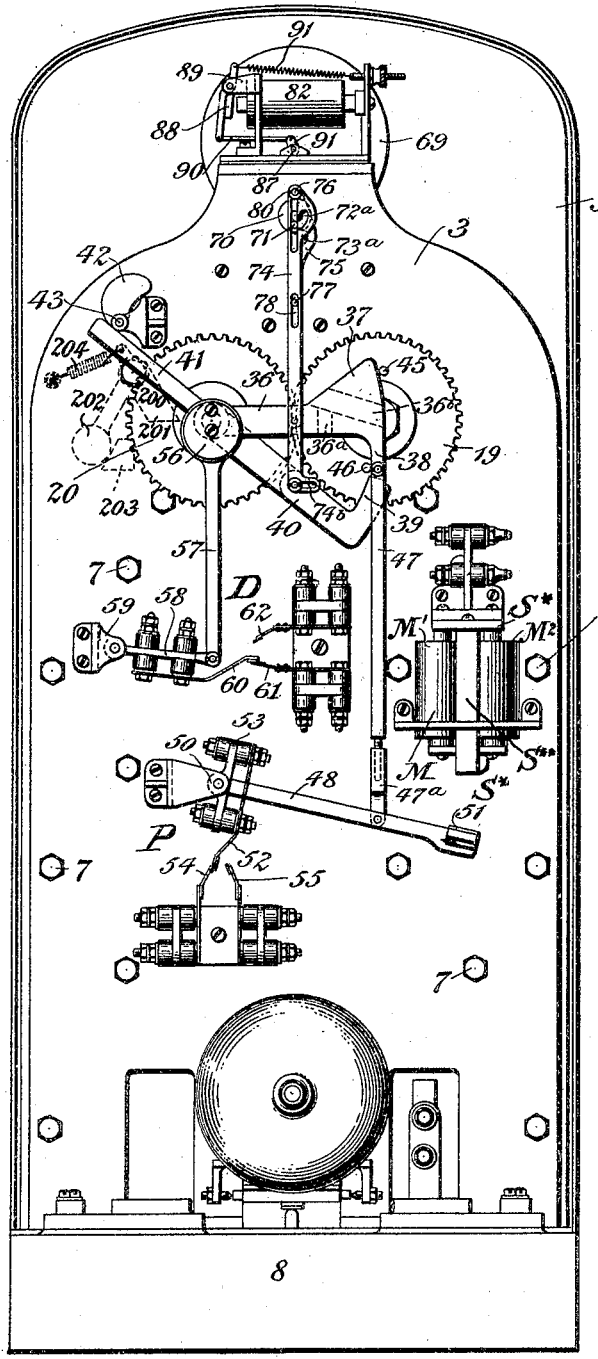
Fig: 4.
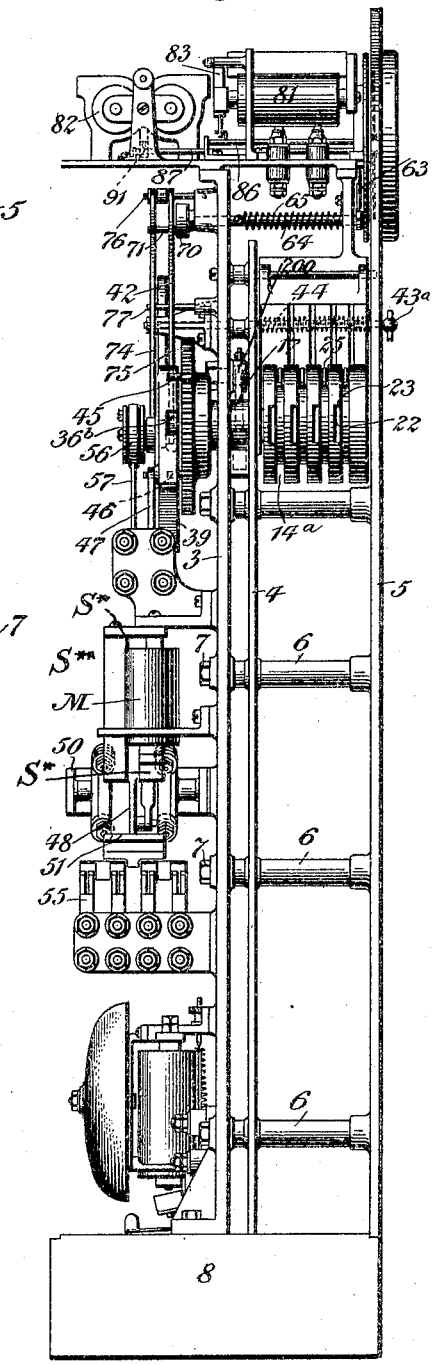
Witnesses:
John A. Rennie
G. Herman Wegner
Inventor:
Thomas H. Patenall
By Geo. E. Cruse
his Attorney No. 794,423. PATENTED JULY 11, 1905.
T. H. PATENALL.
APPARATUS FOR CONTROLLING TRAFFIC ON RAILWAYS.
APPLICATION FILED OCT. 18, 1904.

6 SHEETS—SHEET 3.

Witnesses:
John A. Rennie
A. Herman Wegner

Inventor:
Thomas H. Patenall
By Geo. E. Kruse
his Attorney.

No. 794,423. PATENTED JULY 11, 1905.
T. H. PATENALL.
APPARATUS FOR CONTROLLING TRAFFIC ON RAILWAYS.
APPLICATION FILED OCT. 18, 1904.
6 SHEETS—SHEET 4.
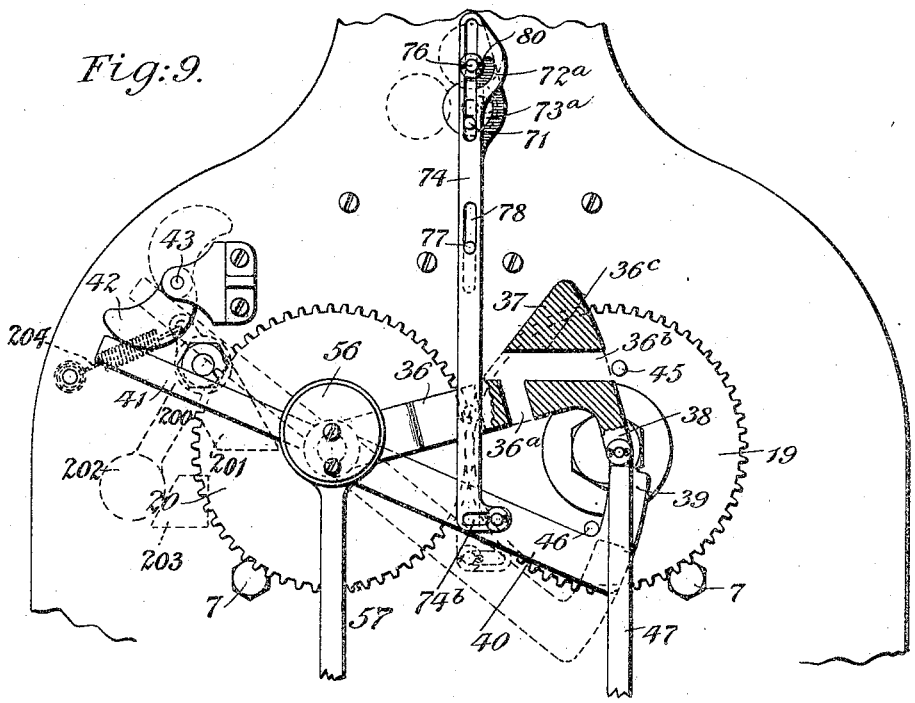
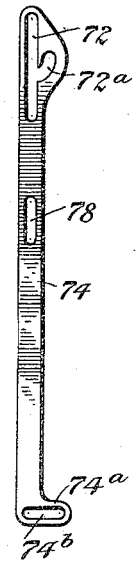
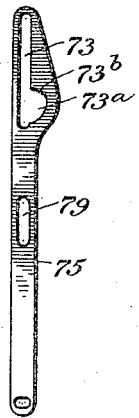
Witnesses:
John A. Rennie.
G. Herman Wegner.
Inventor:
Thomas H. Patenall
By
his Attorney.

No. 794,423. PATENTED JULY 11, 1905.
T. H. PATENALL.
APPARATUS FOR CONTROLLING TRAFFIC ON RAILWAYS.
APPLICATION FILED OCT. 18, 1904.

6 SHEETS—SHEET 5.

Fig. 13.

Witnesses:
G. Herman Wegner
C. W. Van Nostrand

Inventor:
Thomas H. Patenall
By Geo. E. Cruse
his Attorney.

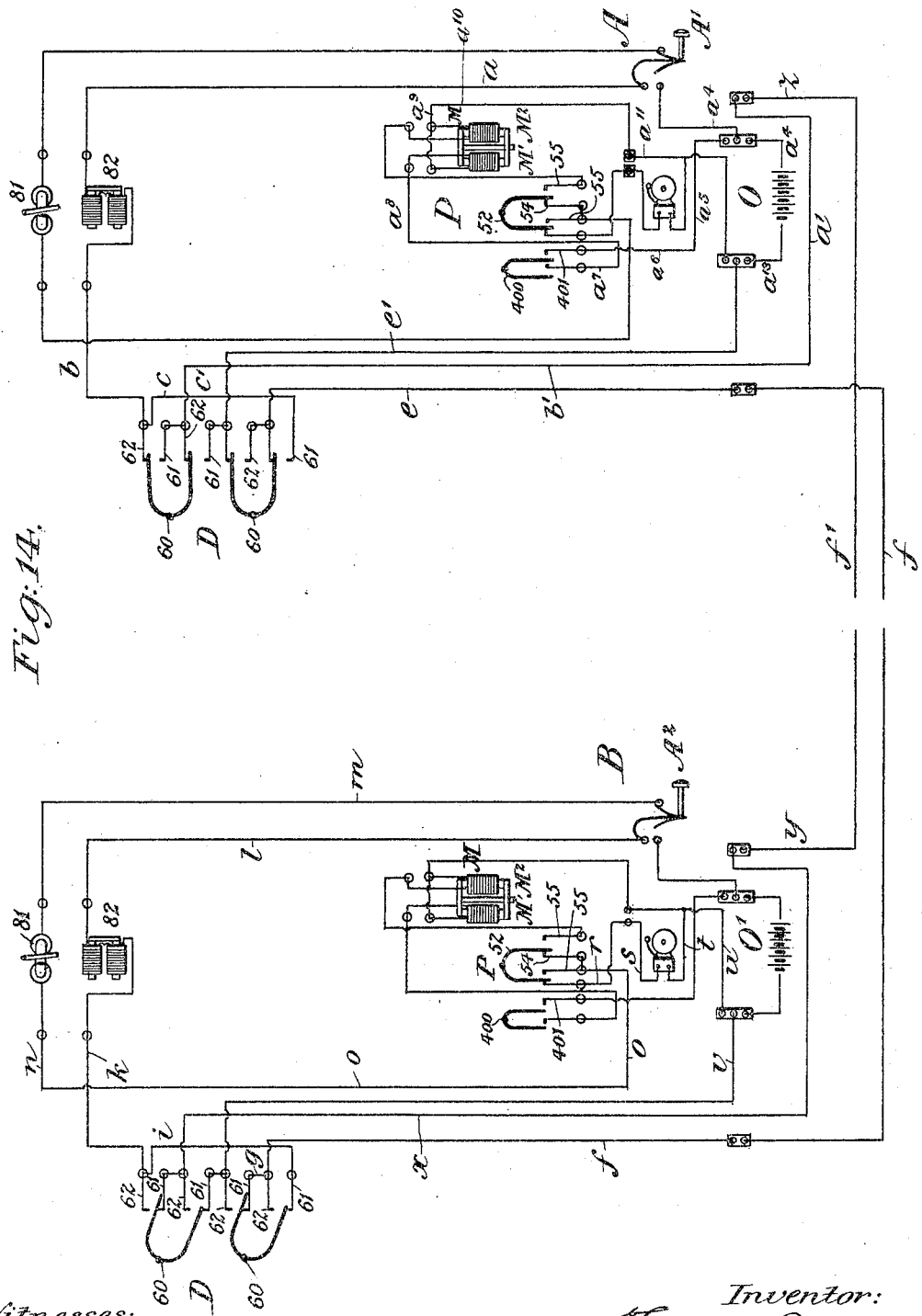

No. 794,423.

Patented July 11, 1905.

UNITED STATES PATENT OFFICE.

THOMAS H. PATENALL, OF WILKINSBURG, PENNSYLVANIA, ASSIGNOR TO THE UNION SWITCH AND SIGNAL COMPANY, OF SWISSVALE, PENNSYLVANIA, A CORPORATION OF PENNSYLVANIA.

APPARATUS FOR CONTROLLING TRAFFIC ON RAILWAYS.

SPECIFICATION forming part of Letters Patent No. 794,423, dated July 11, 1905.

Application filed October 18, 1904. Serial No. 228,930.

*To all whom it may concern:*

Be it known that I, THOMAS H. PATENALL, a citizen of the United States, residing at Wilkinsburg, in the county of Allegheny and State of Pennsylvania, have invented certain new and useful Improvements in Apparatus for Controlling Traffic on Railways; and I do hereby declare that the following is a full, clear, and exact description, sufficient to enable others skilled in the art to which it appertains to make and use the invention.

My invention relates to apparatus for controlling traffic on railways, especially single-track railways, which apparatus are commonly known as "staff instruments." A plurality of staffs is employed in connection with each instrument, wherein they are contained and from which they may under proper conditions be removed one at a time and delivered to an engineer or other member of a train crew as authority to proceed with a train.

In the present invention, as in others of a similar nature, a staff instrument is located at each end of the section of track to be protected, both being connected by appropriate electric circuits and so arranged that the mechanism in one instrument can only be released to deliver a staff therefrom with the sanction of the operator at and by the proper manipulation of the other instrument, so that the removal of a staff without due authority is absolutely prevented, thus effecting perfect control of the section and insuring absolute safety under all conditions to the movement of trains through that section.

Various means have been employed to guard against the insertion within the instrument of staffs other than those originally intended for it, and in all former constructions, so far as I am aware, their arrangement has been such that the staffs have necessarily to be removed in the reverse order of their insertion—*i. e.*, the last staff inserted in the instrument will be the first to be removed, so that under conditions where traffic may at times be limited and the staffs numerous those staffs that are constantly brought into service will be subject to excessive and disproportionate wear as compared with the other or others which may under the above condition remain unused.

Some objects of the present invention are, first, to overcome many of the existing defects in the apparatus at present in use and to produce a staff instrument which shall be extremely simple in its construction and effective in its operation; second, to prevent the insertion of staffs other than those made specially for it; third, to effect the withdrawal of the staffs in the proper and successive order of their insertion, thereby subjecting all of them to the same wear, and, fourth, to give an additional and positive indication in addition to those indicators unusually employed to indicate "staff in," "staff out," and to be hereinafter described that the mechanism and controlling electric circuits are in proper condition to permit of the removal of staff from the instrument.

With these and other objects in view my invention may be said to comprise a staff instrument having a continuous slot therein to receive the staffs, means for preventing the insertion therein of staffs other than those specially designed for it, and means for preventing the unwarranted removal of said staffs.

My invention further comprises an auxiliary indicator whereby a positive clear indication is given when an instrument is in proper condition to permit of the removal of a staff and means for actuating said indicator to give such indication.

My invention further comprises certain novel features of construction and arrangement of parts, all of which will be hereinafter fully described in detail and particularly pointed out in the claims.

To more fully comprehend the nature of my invention, however, and the manner in which the same is or may be carried into effect, reference must be had to the accompanying drawings, forming part of the specification, whereon similar reference letters and numerals indicate corresponding parts in all the figures, and wherein—

Figure 6:
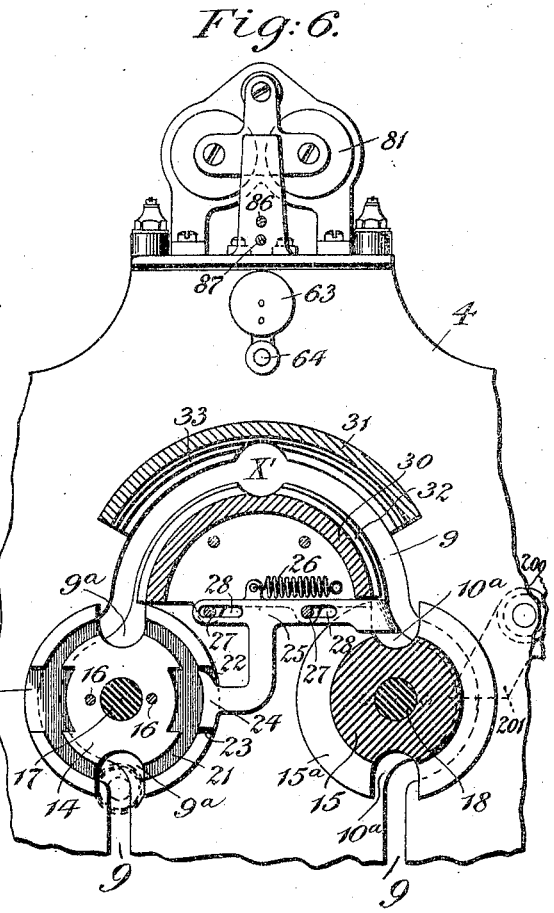
Figure 8:
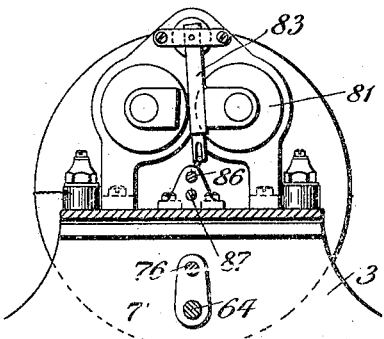
Figure 7:
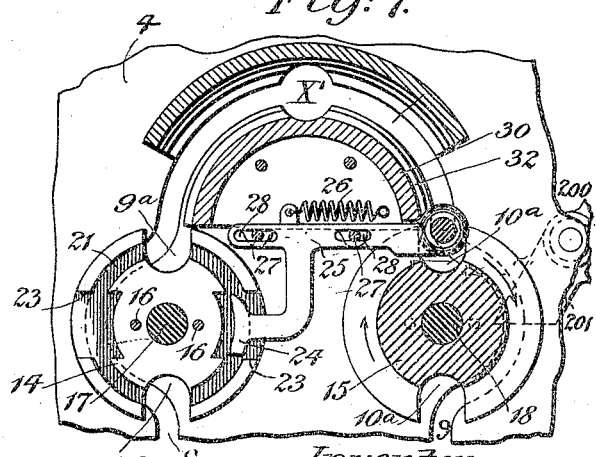

Figure 1 is a front elevation of a staff instrument embodying my invention. Fig. 2 is a side elevation thereof. Fig. 3 is an elevation of the mechanism and its supporting-frame looking from the rear, the cover of the instrument being removed. Fig. 4 is a side elevation thereof looking toward the left. Fig. 5 is a detail sectional elevation of a portion of the mechanism, on an enlarged scale, showing the means for actuating the auxiliary indicator as well as those for locking the staffs against removal from the instrument. Fig. 6 is a detail sectional elevation taken approximately on the line X X of Fig. 5 and showing particularly the locking provision for preventing the insertion of staffs other than the proper ones. Fig. 7 is a similar view showing a proper staff about to be inserted and illustrating the manner of releasing the locking provision to permit of such insertion. Fig. 8 is a detail view of the magnets employed to move the pointer or finger to indicate "staff in" and "staff out." Fig. 9 is a detail rear view, partly broken away, showing the position of the parts just prior to the removal of a staff, the locking-lever for locking the part against rotation being shown in dotted lines and in its released position. Figs. 10 and 11 are respectively the means for controlling the auxiliary indicator and bringing it back to the normal position of danger. Fig. 12 is an elevation of one of the staffs. Fig. 13 is a diagrammatical view illustrating the circuit prior to the operation of the mechanism and also indicating in dotted lines the different contacts after a staff has been removed from the instrument at the right-hand side. Fig. 14 is a similar view illustrating the contacts in the position they assume after a staff has been removed from the same instrument.

I will now proceed to describe my invention in connection with said drawings, premising that they show practical means for putting the same into successful operation, and will then describe the electrical circuits controlling the mechanism, it being understood, however, that I do not limit myself in setting forth the details thereof, as they may be amplified or changed in their construction and combination without departing from my invention.

Referring more particularly to Figs. 1 to 12, inclusive, 1 designates a suitable casing, which is preferably rectangular in shape and within which the mechanism of the apparatus is inclosed, said casing being preferably mounted upon a pedestal or pillar 2, and the latter, being a hollow body, forms a convenient receptacle for such lightning-arresters and terminals as may be appropriate and necessary to the safety and successful operation and control of the instruments.

The framework for supporting the operating mechanism is composed of a series of plates or housings 3, 4, and 5, which are separated from each other and properly spaced apart by means of sleeves 6, provided for the purpose at proper intervals throughout their surfaces, the whole being firmly secured together by means of bolts 7. The plate 3 is secured by suitable bolts to a base 8, which forms the bottom portion of the casing 1 and which is in turn secured to the pedestal or pillar 2 in any convenient manner.

The plates 4 and 5 are provided with registering slots 9 and 10 for the reception of the staffs, which slots are continuous. As these slots are identical, I have illustrated one slot completely, (the slot 10 in plate 5;) but it will be understood that the slots are alike as to contour. This slot (referring now to Fig. 1) at its uppermost point is provided with an opening X', into which the staffs are inserted and from which they are removed. Beneath the opening X' are two semicircular portions 12 and 13, at which points drums, to be hereinafter referred to, are located. The portion of the slot beneath the portion 13 continues downward in a zigzag manner or in reversely-inclined directions to a vertical portion $12^a$, which leads to the semicircular portion 12. The contour of these slots may be changed as desired, provided they are continuous, the advantage being that the staffs are inserted and afterward removed in the proper order of their insertion, so that all are subject to the same amount of wear. An advantage of having that portion of the slots reversely inclined is that the staffs after passing the semicircular portion 13 will revolve in opposite directions. This opposite revolution retards the speed of the staffs and prevents injurious contact with the nearest staff at the bottom of the slots. The slots may be formed in the plates in any desired manner. The plate 5 is cut out and its edge shaped to form the outer wall of the slot. A plate $5^a$ is inserted and suitably secured in the cut-out portion of the plate 5, and its edges form the inner wall of the slot.

The plate 5 in addition to the slot 10 is provided with an opening or orifice 11, within which is arranged an indicator for indicating "staff in" and "staff out," and also the finger or pointer which serves to indicate that the instruments when manipulated are in proper electrical condition with each other and therefore conditioned to permit of the insertion or removal of a staff, and the indicator for showing that the mechanism and certain circuits are in proper condition to permit of the removal of a staff.

14 and 15 designate two drums or cylinders, previously referred to, which are mounted on shafts or arbors 17 and 18, suitably supported in the framework or housings at opposite sides thereof and arranged in approximate horizontal relation with each other. The peripheries of the drums are provided with longitudinally-disposed recesses $9^a$ and $10^a$, located, preferably, at diametrically opposite points of their circumferences. These recesses register with the slots 9 and 10 and receive the body portions of the staffs during the operation of inserting or removing them from the instrument. Both drums are caused to rotate in unison through the medium of intermeshing gear-wheels 19 and 20, mounted, respectively, on the outer ends of the shafts 17 18.

The drum 14 is made up of a plurality of disks 14$^b$, separated from each other so as to form circumferential grooves 14$^a$, and the disks are fastened together in any desired or convenient manner, but preferably by means of bolts or rods 16, which pass through appropriate perforations provided for the purpose in the intermediate disks and having their ends secured in the outermost ones, which latter are in turn fastened to the shaft or arbor 17. The opposite drum 15 is preferably made in one piece and is provided with circumferential grooves 15$^a$, similar to and which register with those just described. While I have shown five of such disks as composing the drum 14, it must be understood that this number may be increased or lessened as found desirable, and by reference to Figs. 6 and 7 it will be seen that these disks, or at least four of them, (represented at 14$^b$ in Fig. 5,) are each provided on its face with an annular groove 21, (see Figs. 6 and 7,) all of which have extensions 22 leading out to their circumferences and being located in the same horizontal plane with each other and at diametrically opposite sides thereof, thereby forming suitable shoulders 23, with which a plurality of spring-actuated locking-dogs 24 engage to lock said drums against rotation, as will readily be understood.

A locking-dog 24 is provided for each of the grooved disks, and they are secured to the ends or made part of slide-bars 25, which extend in the circumferential grooves 14$^a$ of the drum 14, being normally held so as to keep said dogs within the extensions 22 of the grooves 21 through the medium of springs 26 and being further held in their proper relative position with the drums 14 and 15 and also guided in their movement by suitable pins 27, which, passing through open slots 28 formed therein, are secured in the housings or framework. The free ends of these slide-bars 25 extend over to and rest within the grooves 15$^a$ in the drum 15, being so adjusted and arranged that their extremities will lie in a plane approximately parallel with the inner walls of the slots 9 and 10 and directly in the path of travel of the staffs. It will also be observed that these slide-bars vary in length (shown in dotted lines in Fig. 6) to correspond with appropriate variations $v^x$ in the diameter of the staff at those particular points, so that when the proper shaft is inserted, as shown in Fig. 7, the slide-bars will be acted upon to move their attached dogs away from the shoulders 23 of the grooved extensions 22, thus bringing them into concentric register or alinement with the grooves 21, and thereby permitting rotation of the drums and allowing the staff to pass down into the lower portion of the slots 9 and 10, as will be understood. On the other hand, where attempt is made to insert a staff which is not specially designed for it it will be obvious that the slide-bars will not be disturbed thereby, so that their attached dogs will remain within the recesses 22 or be forced over too far. Thus said drums will still be effectively locked against rotation.

As an additional precaution against the insertion of staffs other than those specially designed for the apparatus I provide means which conform to the ribs and grooves on the body of the staffs, as best seen in Figs. 5 and 6. As here shown, these means comprise arched crown-pieces or guide-plates 30 and 31, arranged adjacent the upper and lower walls of the arched upper portions of the slots 9 and 10 and between the housings 4 and 5, to which they are secured, the outer surface of the one, 30, and the under side of the other, 31, being provided with a plurality of ribs 32 and 33, respectively, of varying widths and degrees of radii to correspond with the varying and irregular diameters in the body portion of the staff, previously mentioned, so that when the latter is inserted within the opening X' of the slots 9 and 10, which may properly be termed a "keyhole," its varying and irregular formations, if they conform to the irregular and varying widths and radii of the ribs 32 and 33, will allow the staff to pass downwardly, so as to act upon the slide-bars 25 and release the lock for the drums, thence into the longitudinal open recesses 10$^a$, previously described. It will therefore be apparent in cases where these irregularities in the crown-pieces or guide-plates and those on the staff do not agree that the staff cannot be moved into the slots 9 and 10 in one direction or the other. Thus unwarranted tampering with the instrument or otherwise leading to confusion or undue blocking of the same is effectively prevented.

To prevent unwarranted rotation of the drums to remove a staff, I provide locking means, which, as shown, comprise an arm 36, loosely supported on the shaft or arbor 18, having an enlarged head 37 and a downwardly-projecting extension 38, against which abuts the upturned nose or extension 39 of a lever 40, which is also loosely supported on the shaft or arbor 18 and has its free end 41 resting under and against a cam 42, the latter being carried by a shaft 43, supported in the framework and terminating in a handle 43$^a$ on the outside of the casing, by which it is turned. This cam is normally held in the position shown in full lines in Fig. 3 (and in dotted lines in Fig. 9) by means of a torsional spring 44, (shown in dotted lines in Fig. 4,)

which is wound around said shaft and to which one end of it is secured, its other end being fastened to the framework or housing.

45 and 46 designate studs which project from the face of the gear-wheel 19, of which the former bears against the enlarged head 37 of the arm 36 on the one side and the latter against the extension 38 on the other side.

While the mechanism is in the position shown in Fig. 3, which may be termed the "normal" or "locked" position, the drum 14 will be secured against rotation in one direction—the direction which will prevent the removal of a staff—but rotation of the shaft 43 will cause the cam 42 to assume the position shown in full lines in Fig. 9, during which operation the free end of the lever 41 will be lowered and its opposite end 40 raised, thereby lifting the end of the arm 36 so as to bring a grooved portion $36^b$, formed therein, into concentric alinement with the studs 45 and 46; but it will be observed that the nose or extension 39 on the lever 40 will still engage the stud 46, thus locking the gears and drums 14 and 15 against rotation. In order to permit of such rotation, however, and the removal of a staff, magnets M and an armature 51 are employed to keep the arm 36 in its lifted position, as I shall presently describe. The lever 40 will then be allowed to fall by gravity, so as to gradually assume its former position, as shown in dotted lines in Fig. 9, as the cam 42 is being brought back to its initial position under the influence of the spring 43.

In the position of the parts just described—that is, with the arm 36 in its lifted position and the lever 40 in its lowered position—the groove $36^b$ is brought into register or concentric alinement with the studs 45 and 46, thereby permitting the latter to pass under the extension 38 of arm 36 and the former to enter said groove $36^b$ therein, so that when a staff is being removed from the apparatus and is lifted into the longitudinal slot $9^a$ of the drum 14, as shown in dotted lines in Fig. 6, it will be evident that by a continued upward movement of the staff said drum will be rotated, and during this operation the stud 45 will bear against the lower wall of the groove $36^b$, thereby forcing or releasing the arm from the influence of the magnets M and causing it to assume its lowermost or normal position, again locking the drums against rotation in the same direction. The magnets M comprise two coils M' $M^2$, (see Figs. 3, 13, and 14,) which are wound independently of each other, and the coils are connected by means of the strap S*. Connected to the upper strap is a pole-piece S. The pole-piece S forms one pole of the magnet, and the lower strap S* forms the other pole-piece. The purpose of this arrangement will appear hereinafter.

It will be observed by reference to Figs. 6 and 7 that the upper portion of the dogs 24 are chamfered or rounded, their extreme points projecting within the concentric grooves of the disks $14^b$, so that when a staff is in position to be removed from the instrument (shown in dotted lines in Fig. 6) and the drums are in the unlocked position just described said drums will be permitted to rotate by reason of the shoulder formed at the upper end of the recesses 22 passing over the chamfered or rounded extremities of the dogs 24, forcing them out from said recesses 22 into the concentric grooves 21.

In order to prevent a staff from being taken out past the drum 15 while the parts are in the unlocked position described, I provide a suitable locking device 200, which is pivotally supported in the housings and adapted to normally span the slots 9 and 10, so as to lie in the path of travel of the staffs at a point contiguous to the drum or cylinder 15. The locking device as here shown comprises oppositely-disposed inclined members 201 and 202, the former inclining downwardly from its pivotal point and the latter having a weighted extremity which rests against a stop 203, thus limiting its movement in one direction and also maintaining it in its proper operative position. (Shown in dotted lines in Figs. 3, 6, 7, and 9.) Thus when a staff is being inserted it will pass down the inclined member 201, moving it out of the way and lifting the weighted end, and so allowing the staff to pass into the zigzag portion of the slots 9 and 10, after which the weighted extremity will return the locking device to its normal position. Obviously where attempt is made to remove a staff in the wrong direction such staff will only rotate the drum 15 until it contacts with the lower extremity of the member 201, which will check further rotation thereof, and so prevent the removal of the staff. A return-spring 204 (dotted lines, Figs. 3 and 9) may also be provided to further insure the quick and proper return of the locking device to its normal or operative position.

It will be evident that when a proper staff shall have been inserted within the opening X' and moved to release the locking-dogs 24, as shown in Fig. 7, rotation of the drums will be permitted in the direction of the arrows, during which operation the stud 46 will pass into a vertical portion $36^a$ of the groove $36^b$ and engage the upper wall $36^c$ thereof, thereby lifting said arm so as to permit of the stud 45 passing underneath the extension 38 of the arm 36, after which the latter will again fall to its former position to locking the drum against further rotation.

It will be understood that a proper staff may be inserted in any one instrument and at any time irrespective of any other instrument.

The connection between the armature 51 of the magnets M and the arm 36, as shown, comprises a link or rod 47, which is pivotally secured at one end to the extension 38 and at its other end to a swinging arm 48, which latter is fulcrumed in a bearing 50, secured to the plate or housing 3, and carries the armature 51. In order to provide for the correct adjustment of the parts just described, I prefer to make the link 47 in two parts, the part 47ª being pivoted to the swinging arm 48 and being provided with a threaded socket adapted to receive the threaded extremity of the part 47. The lifting of the armature 51 will also operate a circuit-controller which, as shown, comprises contact-plates 52, supported in a suitable bracket 53, (movable with the swinging arm 48,) and stationary contact-plates 54 and 55. These contact-plates are arranged in pairs, as diagrammatically illustrated in Figs. 13 and 14. When the mechanism is in its normal or locked position, the contact-plates 52 will engage the contact-plates 54, which control the bell-circuits in each apparatus, so that when the proper button is pushed upon by the operator at one end of the block the current will pass out to the instrument at the other end, sounding the bell in that instrument and so giving warning that it is the desire of such operator to remove a staff. The operator at the instrument so signaled will, if the block is clear and a train may safely be sent through it, push in a like button in his instrument and maintain pressure thereon, causing a similar alarm to be given, which will indicate that a staff may be removed, and the operation of turning the shaft 43 and its attached cam 42 to lift the arm 36, as previously described, will have the effect of shifting the contact-plates 52 away from the contact-plates 54 over to impinge the contact-plates 55, thereby breaking the bell-circuit, simultaneously closing the circuit on both the local and line magnets M' M², and coincidently lifting the armature into engagement with the poles of the magnets M.

56 designates an eccentric which is secured to and operated through the rotation of the shaft or arbor 18 during the insertion or removal of the staff and which operates a circuit-controller D. The eccentric has depending from it a rod 57, whose lower end is pivotally connected to a swinging arm 58, fulcrumed in a suitable bearing 59, secured to the plate 3 and comprised in the circuit-controller D. The arm 58 carries contact-plates 60, insulated therefrom, and which are adapted to move between the pair of contact-plates 61 and 62. This circuit-controller is, in effect, a pole-changer and serves to change the polarity of a current, as will be more fully and clearly described in connection with the diagrammatic views shown in Figs. 13 and 14. The contact-plates 60, 61, and 62 are arranged in pairs, as illustrated diagrammatically in Figs. 13 and 14.

An auxiliary indicator is provided for the purpose of giving a positive indication that the mechanism within the instrument has been properly manipulated to place the parts in the necessary position to permit of the removal of a staff, and it comprises a disk 63, arranged upon a shaft 64, suitably mounted in the housing of framework, and upon which latter a torsional spring 65 is wound, one end of said spring being secured to the shaft at 66 and the other end to the framework, as represented at 67. This spring is so arranged on the shaft as to impart a rotative movement thereto when a proper release of the parts is effected, as I shall presently describe, so that said disk, which may be provided with a color indicating "danger" and which normally registers with an opening 68 in a plate 69, located adjacent the orifice 11 in the housing 5, will be moved to one side to display a white or clear indication.

Upon the end of the shaft 64 opposite that on which the disk 63 is mounted a collar 70 is secured, from the face of which projects a stud or pin 71, which passes through the slotted ends 72 73, respectively, of bars 74 and 75, the former being pivotally connected at its lower end to the lever 40, while the latter has its lower end similarly connected to the arm 36. These bars are guided in their vertical movement and properly held in place by means of pins 76 and 77, which pass through the slotted portions 72 73 thereof and through additional slots 78 79, and upon which suitable washers are placed, the latter being held in place by appropriate cotter-pins 80, as shown. The lower end of the bar 74 has a lateral extension 74ª, in which a horizontally-disposed slot 74ᵇ is provided and in which the pivot therefore will move, so as to compensate for the outward movement of said pin when the lever 40 is being lifted.

The slots 72 73 have concentric extensions 72ª 73ª, which when the lever 40 is in its lowermost or normal position, as best seen in Fig. 3, will lie the one, 72ª, in a direct line of travel of the pin or stud 71 and the other, 73ª, at a point lower down, so that the pin or stud 71, through its contact with the straight walls of the slot 73, will be prevented from entering the slot 72ª, thereby keeping the shaft 64 from rotating under the influence of the spring 65 and the disk 63 at "danger." When the lever 40 has been operated, as previously described, to lift the arm 36, the slot 73ª will be brought into register with the pin or stud 71, where it will be held, (through the influence of the magnets M,) and during this operation the stud or pin 71 will pass into that portion of the slot 72 below its concentric extension 72ª, thereby keeping the disk 63 still at the danger indication. The lever 40 being then allowed to fall back to its normal position, it will be evident that the bar 74 will follow with it, bringing the concentric slot 72ª into register with both the slot 73ª and the pin or stud 71, whereupon the spring 65 will rotate the shaft 64, causing the disk 63 to move to one side and display a clear indication.

Note A. The upper portion of the slot $73^a$ inclines upwardly, as represented at $73^b$, forming a shoulder against which the pin 71 will rest when the disk has been turned, as previously described, to give the white or some such visual indication that the instrument is unlocked and the mechanism properly set for the removal of a staff therefrom, the engagement of said pin with the shoulder $73^b$ effectively limiting the rotative movement of the rod 64 and keeping said disk in such position. When, however, the arm 36 has been positively lowered through the withdrawal of a staff, the rod 75 will be lowered with it, causing the pin 71 to rotate the disk 63 in an opposite direction, bringing it back again to its initial position and disclosing the red or some such visual indication that the instrument is locked and its mechanism properly set to prevent the removal of another staff therefrom. During such operation it will be apparent that the pin 71 will pass along the inclined portion $73^b$ and into the vertical portion of the slot 73, again locking said disk in such position, and thus giving visible indication that the instruments have been properly manipulated and that a staff has been removed therefrom.

The fingers or pointers 84 and 85, respectively, for indicating "staff in" and "staff out" and for giving indication that the instruments are in proper electrical communication are controlled in the former instance by the polarized magnets 81 (shown in detail in Fig. 8) and in the latter instance by the neutral magnets 82. Thus when an apparatus is properly manipulated to place the mechanism in position to remove a staff and a staff is being removed the current passes through the coils of the magnets 81, attracting a swinging armature 83, whose free end is pivotally connected to a rock-shaft 86, and which has the finger or pointer 84 secured thereto, thereby moving the latter over to indicate "staff out," in which position it will remain as long as such current is of the same polarity. A reversal of the current, caused by a staff being put into the instrument, will of course cause the armature 83 to be repelled from the one and attracted to the other, thereby shifting the finger or pointer back again to indicate "staff in," which position may be properly termed the "normal" one, indicating that the instruments are in synchronous relation with each other.

The finger or pointer 85 is mounted upon the end of a rock-shaft 87, located below the shaft 86, and which is connected to an armature 88, pivotally supported in a bracket 89 through the medium of a link 90 and arm 91, the latter being secured to said shaft, and which may properly be termed a "crank-arm," so that when the current is passing through the magnets 82 of the neutral indicator in an instrument at one end and has established communication with the instrument at the other end of the block such armature will be attracted to the poles of said magnets, thereby moving the finger or pointer 85 to one side, where it will remain so long as such circuit is closed, thus giving positive assurance that such communication has actually been established. A return-spring 91 is provided, as shown, for bringing the armature 88 back to its normal position after the magnets 82 have been deënergized, thereby causing the finger or pointer 85 to assume its initial position, as will be obvious.

Having now described the mechanism and the mechanical operation of the instrument and having also briefly referred to the electrical accessories found necessary for the purpose of facilitating the better understanding of such operation, I will now describe in detail the controlling electric circuits, referring more particularly to Figs. 13 and 14.

Assuming that A and B represent two staff instruments embodying my invention and located one at each end of a block or section of track to be protected and that the operator at the one, A, desires to remove a staff therefrom, he will first press in the bell-key A' of his instrument, closing a circuit that leads from a battery at A through the bell at B. This circuit, starting from battery O through wire $a^4$, key A', wire $a$, the neutral magnets 82 of the neutral indicator, wires $b$ and $c$, through contact-plates 60 61 of the pole-changer D, wire $e$, line-wire $f$, to the instrument at B. In the instrument B the circuit continues through wire $g$, contact-plates 60 61 of pole-changer D, wire $i$, wire $k$, the magnets 82 of the neutral indicator, wire $l$, bell-key $A^2$, wire $m$, polarized magnets 81, wires $n$ and $o$, thence through the contact-plates 52 and 54 of the circuit-controller P, and following on through wires $r$ and $s$ to the bell in B, thence through wire $t$, wires $u$ and $v$, through the other pair of contact-plates 60 61 of pole-changer D, wires $x$ and $y$, line-wire $f'$ to the instrument at A. In the instrument at A the circuit continues through wires $z$, wires $a'$, $b'$, and $c'$, to the other pair of contacts 60 61 of pole-changer D and wire $e'$ and $a^{13}$ back to the battery O. Current flowing from the battery O will ring the bell in the instrument at B, the operator at the instrument A pushing his key to give the proper signal and finally leaving the key in open position. The operator at B will then press his bell-key, and the circuit formed by the bell-key at B will follow in a similar manner back to the instrument at A, sounding the bell therein. The current for the bell in A is supplied from the battery O' in the instrument at B. The operator at the instrument B will maintain the pressure upon his bell-key, and the operator at the instrument A will then turn the handle 43ª in his instrument, causing the cam 42 to move the mechanism previously described, so as to bring the armature-plate 51 into contact with the magnets M and simultaneously moving the contact-plates 52 over to impinge the contacts 55, thereby breaking the circuit of the bell in his instrument and transferring the current from battery O to the coil $M^2$, comprised in the magnet M. At the same time he closes a circuit from battery O through the coil M' through specially-provided contacts 400 401, which are operated at the same time as the circuit-controller P. This circuit is battery O, wires $a^4$, $a^5$, and $a^6$, contacts 400 401, wires $a^7$ $a^8$, coil M', and wires $a^9$, $a^{10}$, $a^{11}$, $a^{12}$, and $a^{13}$ to battery O. Current from the battery in each instrument will flow always in one direction through the coil M'. Current from the battery in one instrument will flow in opposite directions through the coil $M^2$ in another instrument, according to the positions of the pole-changer D in either instrument. So long as current flows simultaneously through the coils in opposite directions—that is, one direction through one coil and in the opposite direction in the other coil—the magnet M will hold its armature. When current flows through the coils in the same direction, the magnet will not hold its armature. This is due to the fact that the magnetic lines of force produced by both coils flow in the same direction instead of opposing each other, which will be the case when current flows through the coils in opposite directions. When the armature 51 is held up by the magnet M, the instrument at A is in condition to have a staff removed. With the circuits completed as above described the armature will be held up. A staff having been lifted into the longitudinal groove of the drum 14, as shown in the dotted lines in Fig. 6, by the operator at A, a continued upward movement thereof will rotate said drum and coincidently move the eccentric to lift the contact 60 away from the contact-plates 61 and into engagement with those at 62, Fig. 14, and thus changing the direction of the current in the line-coil $M^2$. Current will then flow through the coils of the magnet M in the same direction and annulling the attractive power of said magnet. The armature will then drop to its initial position, which coincidently moves the controller 52 and breaks the circuit on the coils M' and $M^2$ and again closes the circuit on the bell in instrument A.

The circuits through the neutral indicators, the bell, and polarized indicator in instrument A are the same as originally, with the current-circuit reversed due to the shifting of the circuit-controller D, and this reversal of the current causes the pointer of the polarized indicator in instrument A to indicate "staff out." At the time when B closed his bell-key to release A the pointers of the neutral indicators shifted and remain shifted until A operates the handle 43ª, at which time the circuits of the neutral indicators are broken and the pointers return to their central position and are again shifted upon the contact-plates 52 of circuit-controller P being moved over to impinge the contacts 55. When A removes the staff from his instrument, the circuit through the neutral indicators in A and B are again broken and the pointers again return to central position, which is a signal to B that he can release his bell-key.

While the pole-changers D are in the position shown in Fig. 14 the current from A to B and B to A (when circuit is closed) would flow in a direction contrary to that necessary to energize magnets M, thereby preventing the unlocking of either machine to permit the withdrawal of another staff, and in order to reëstablish such connections it will be necessary to either reinsert the staff so removed from the instrument at A or to insert it into that at B, whereby the drums in the instrument receiving such staff will be caused to rotate, so as to bring the pole-changers into synchronism, as shown in dotted lines in Fig. 13, with those in the other or opposing instrument, which will again place both instruments into position to perform their proper functions.

Having thus described my invention, what I claim, and desire to secure by Letters Patent, is—

1. A staff instrument, comprising a suitable casing, formed with a continuous open slot, adapted to receive the staffs and within which the staffs are retained, and means for preventing the unwarranted removal of said staffs.

2. A staff instrument, comprising a suitable casing, formed with a continuous open slot, adapted to receive the staffs and within which the staffs are retained, means for preventing the insertion therein of staffs other than those specially designed for it, and means for preventing the unwarranted removal of said staffs.

3. A staff instrument, comprising a suitable casing, having a continuous open slot therein, adapted to receive the staffs and within which the staffs are retained, and means adjacent the point of ingress into said slot for said staffs, whereby staffs other than those specially designed for it, are prevented from passing into said slot.

4. A staff instrument, comprising a suitable casing, having a continuous open slot therein, adapted to receive the staffs and within which the staffs are retained, means adjacent the point of ingress into said slot for said staffs, whereby staffs other than those specially designed for it, are prevented from passing into said slot, and means for preventing the unwarranted removal of a proper staff, after its insertion within the slot.

5. A staff instrument, comprising a suitable casing, having a continuous open slot therein, adapted to receive the staffs, the latter having circumferential enlargements at intervals throughout their length, means adjacent the point of ingress into said slot, having corresponding irregularities to register with those in the staff, whereby the latter are permitted to pass into said open slot, and means for preventing the unwarranted removal of a staff, after such insertion within the slot.

6. A staff instrument, comprising a suitable casing, having a continuous open slot therein, adapted to receive the staffs, said slot having an enlargement which forms the point of ingress and exit of the staffs, and means adjacent thereto, and at each side thereof, whereby staffs other than those specially designed, are prevented from passing into said slot in one direction or the other.

7. A staff instrument, comprising a suitable casing, having a continuous open slot therein, adapted to receive the staffs, said slot having an enlargement which forms the point of ingress and exit of the staffs, means adjacent thereto, and at each side thereof, whereby staffs other than those specially designed for it, are prevented from passing into said slot, and means for preventing the unwarranted removal of a proper staff, after its insertion within the slot.

8. A staff instrument, comprising a suitable casing, having a continuous open slot therein to receive the staffs, revoluble means in the path of travel of said staffs, adapted to receive them after their insertion within said slot, and locking provisions for locking said revoluble means against rotation in one direction or the other, whereby said staffs are prevented from being removed from, or inserted within the casing.

9. A staff instrument, comprising a suitable casing, having a continuous open slot therein to receive the staffs, revoluble means located at both sides of said slot and in the path of travel of said staffs, and adapted to receive them during their insertion within, or removal from, the instrument, and a locking provision for locking said revoluble means to prevent the removal of a staff.

10. A staff instrument, comprising a suitable casing, having a continuous open slot therein to receive the staffs, oppositely-disposed drums arranged in the path of travel of said staffs, and adapted to revolve in unison during the insertion within, or removal of said staffs from the instrument, and a locking provision adapted to engage said drums, whereby they are locked against rotation, and the removal of the staffs prevented.

11. A staff instrument, comprising a suitable casing, having a continuous open slot therein to receive the staffs, oppositely-disposed drums having longitudinal grooves therein arranged in the path of travel of said staffs, and adapted to revolve in unison during the insertion within, or removal of said staffs from the instrument, and a spring-actuated locking provision adapted to engage said drums, whereby they are locked against rotation.

12. A staff instrument, comprising a suitable casing, having a continuous open slot therein to receive the staffs, oppositely-disposed drums having longitudinal grooves therein arranged in the path of travel of said staffs, and adapted to revolve in unison during the insertion within, or removal of said staffs from the instrument, and a locking provision adapted to engage said drums, whereby they are locked against rotation.

13. A staff instrument, comprising a suitable casing, having a continuous open slot therein to receive the staffs, oppositely-disposed drums having longitudinal grooves therein arranged in the path of travel of said staffs, and adapted to revolve in unison during the insertion within, or removal of said staffs from the instrument, locking provisions adapted to engage said drums, whereby they are locked against rotation, and means for releasing one of said locking provisions, whereby said drums are permitted to rotate during the removal of a staff.

14. A staff instrument, comprising a suitable casing, having a continuous open slot therein to receive the staffs, oppositely-disposed drums arranged in the path of travel of said staffs, and adapted to revolve in unison during the insertion within, or removal of said staffs from the instrument, locking provisions adapted to engage said drums, whereby they are locked against rotation, in one direction or the other, and means for releasing one of said locking provisions, whereby said drums are permitted to rotate during the removal of a staff.

15. The combination with a staff instrument, of an auxiliary indicator arranged to normally display a red or other visual indication when the instrument is locked to prevent the removal of a staff therefrom, and means for moving said indicator to give an opposing indication when the instrument is unlocked to permit of the removal of a staff therefrom.

16. The combination with a staff instrument, of a spring-actuated auxiliary indicator arranged to normally display a red or other visual indication when the instrument is locked to prevent the removal of a staff therefrom, and means for releasing said indicator whereby an opposing indication is given when the instrument is unlocked to permit of the removal of a staff therefrom.

17. The combination with a staff instrument, of a spring-actuated auxiliary indicator arranged to normally display a red or other visual indication when the instrument is locked to prevent the removal of a staff therefrom, means for releasing said indicator whereby an opposing indication is given when the instrument is unlocked to permit of the removal of a staff therefrom, and means for returning said indicator to its normal position.

18. A staff instrument, comprising a suitable casing, having a continuous open slot therein, to receive the staffs, drums revolubly supported in said casing, and arranged in the path of travel of said staffs, and having longitudinal grooves therein for the reception of said staffs during their insertion within, or removal from the instrument, a locking provision comprising a plurality of spring-actuated dogs, adapted to engage said drums and prevent their rotation, and having extensions therefrom, of varying lengths, and a staff having circumferential irregularities coinciding with, and adapted to engage irregular extensions of the dogs, whereby they are moved to unlock the drums and permit of the insertion of a staff.

19. A staff instrument, comprising a suitable casing, formed with a continuous open slot, adapted to receive the staffs and within which said staffs are retained.

20. A staff instrument, comprising a suitable casing, formed with a continuous open slot, adapted to receive the staffs and within which said staffs are retained, means for preventing the insertion therein of staffs other than those specially designed for it.

21. A staff instrument, comprising a suitable casing, having a continuous open slot within which the staffs are retained mechanism for permitting the withdrawal from and insertion of said staffs in the casing in successive order and means for preventing the unwarranted removal of a staff from the casing.

22. A staff instrument, the combination with a casing, means comprising two drums, provided with intermeshing gears for permitting the insertion and removal of staffs from the casing in successive order and means electrically controlled for permitting the withdrawal of a staff from the casing.

23. A staff instrument, comprising a suitable casing, having a continuous open slot within which the staffs are retained mechanism for permitting the withdrawal from and insertion of said staffs in the casing in successive order, means for preventing the unwarranted removal of a staff in the proper direction, and means for preventing the removal of said staff in reverse order or opposite direction.

24. A staff instrument, comprising a suitable casing, having a continuous open slot within which the staffs are retained mechanism for permitting the withdrawal from and insertion of said staffs in the casing in successive order, means for preventing the unwarranted removal of a staff in the proper direction, and a spring-actuated locking device adapted to lock said staff against removal in the wrong direction or reverse order of insertion.

In testimony whereof I have signed my name to this specification in the presence of two subscribed witnesses.

THOMAS H. PATENALL.

Witnesses:
WALTER DICKSON,
W. H. CADWALLADER.